US010883738B2

(12) United States Patent
Tang et al.

(10) Patent No.: US 10,883,738 B2
(45) Date of Patent: Jan. 5, 2021

(54) WATER MANAGEMENT SYSTEM OF A DUAL-AIR DUAL-WATER EVAPORATIVE COOLING APPARATUS

(71) Applicant: INNOSPARKS PTE LTD, Singapore (SG)

(72) Inventors: Ee Ho Tang, Singapore (SG); Fuyun Li, Singapore (SG); Tze Wei Timothy Ang, Singapore (SG); Tsz Kin Clifford Cheung, Singapore (SG)

(73) Assignee: ST ENGINEERING INNOSPARKS PTE. LTD., Singapore (SG)

( * ) Notice: Subject to any disclaimer, the term of this patent is extended or adjusted under 35 U.S.C. 154(b) by 54 days.

(21) Appl. No.: 16/320,287

(22) PCT Filed: Jul. 25, 2017

(86) PCT No.: PCT/SG2017/050375
§ 371 (c)(1),
(2) Date: Jan. 24, 2019

(87) PCT Pub. No.: WO2018/021967
PCT Pub. Date: Feb. 1, 2018

(65) Prior Publication Data
US 2019/0271484 A1    Sep. 5, 2019

(30) Foreign Application Priority Data

Jul. 25, 2016    (SG) .............................. 10201606116P (51) Int. Cl.
*F24F 11/65* (2018.01)
*F24F 5/00* (2006.01)
*F24F 6/04* (2006.01)

(52) U.S. Cl.
CPC ............. *F24F 11/65* (2018.01); *F24F 5/0035* (2013.01); *F24F 6/04* (2013.01)

(58) Field of Classification Search
CPC ............. F24F 5/0035; F24F 6/04; F24F 11/65
See application file for complete search history.

(56) References Cited

U.S. PATENT DOCUMENTS 3,116,612 A    1/1964 Pennington
4,380,910 A    4/1983 Hood
(Continued)

FOREIGN PATENT DOCUMENTS

CN    104061638 A    9/2014
CN    104061641 A    9/2014
(Continued)

OTHER PUBLICATIONS

European Search Report for corresponding application EP17834870: Report dated Feb. 28, 2020.
(Continued)

*Primary Examiner* — Marc E Norman
(74) *Attorney, Agent, or Firm* — Cantor Colburn LLP (57) ABSTRACT

An apparatus (100) is disclosed, which comprises a fluid storage device (104) for holding a volume of coolant; a cooling device (106) having a heat exchanger (108) and a first evaporative media (110) arranged in fluid communication with the fluid storage device, the cooling device configured to enable air to be passed therethrough; and a heat rejection device (112) having a second evaporative media (114) arranged in fluid communication with the fluid storage device and the heat exchanger. The apparatus is operable between at least first and second modes for lowering temperature of the air, in which in the first mode, only the first evaporative media is operatively activated to use the coolant to cool the air to a first temperature, and in the second mode, the first and second evaporative media and the heat
(Continued)

exchanger are collectively activated to use the coolant to cool the air to a second temperature being lower than the first temperature.

10 Claims, 5 Drawing Sheets

(56) References Cited

U.S. PATENT DOCUMENTS

| | | |
|---|---|---|
| 4,910,971 A | 3/1990 | McNab |
| 4,926,656 A | 5/1990 | Hickly |
| 5,460,004 A | 10/1995 | Tsimerman |
| 2016/0102919 A1 | 4/2016 | Kinkel |

FOREIGN PATENT DOCUMENTS

| | | |
|---|---|---|
| WO | 2011074005 A2 | 6/2011 |
| WO | 2017138889 A1 | 8/2017 |

OTHER PUBLICATIONS

International Search Report for corresponding application PCT/SG2017/050375 filed Jul. 25, 2017; dated Sep. 18, 2017.
Written Opinion for corresponding application PCT/SG2017/050375 filed Jul. 25, 2017; dated Sep. 18, 2017.

WATER MANAGEMENT SYSTEM OF A DUAL-AIR DUAL-WATER EVAPORATIVE COOLING APPARATUS

FIELD

The present invention relates to an apparatus.

BACKGROUND

The dual-air dual-water evaporative cooling system has demonstrated potential in providing deeper cooling than the conventional direct evaporative cooling system. Specifically, the cold water at the wet bulb temperature produced within the evaporative cooling system provides sensible temperature reduction for incoming air, while a high efficiency cooling media ensures a further boost in air temperature through direct evaporative cooling. But however, for the whole cooling process, water management and its configuration plays an important role.

One object of the present invention is therefore to address at least one of the problems of the prior art and/or to provide a choice that is useful in the art.

SUMMARY

According to a $1^{st}$ aspect of the invention, there is provided an apparatus comprising: a fluid storage device for holding a volume of coolant; a cooling device having a heat exchanger and a first evaporative media arranged in fluid communication with the fluid storage device, the cooling device configured to enable air to be passed therethrough; and a heat rejection device having a second evaporative media arranged in fluid communication with the fluid storage device and the heat exchanger. The apparatus is operable between at least first and second modes for lowering temperature of the air, in which in the first mode, only the first evaporative media is operatively activated to use the coolant to cool the air to a first temperature, and in the second mode, the first and second evaporative media and the heat exchanger are collectively activated to use the coolant to cool the air to a second temperature being lower than the first temperature.

Preferably, the coolant may include water.

Preferably, the apparatus may further comprise first and second pumps respectively coupled to the first evaporative media and the heat exchanger to circulate the coolant thereto.

Preferably, the second evaporative media may be in fluid communication with the fluid storage device via the first evaporative media.

Preferably, the apparatus may further comprise a three way valve coupled to the first and second evaporative media, and the first pump to enable selective circulation of the coolant to at least one of the first and second evaporative media.

Preferably, the three way valve may be adapted to be controlled using a logic controller.

Preferably, the apparatus may further be operable in a third mode, in which only the first and second evaporative media are activated to use the coolant to cool the air to the first temperature.

Preferably, the apparatus may further comprise a pump coupled to the first evaporative media and the heat exchanger via a three way valve to enable selective circulation of the coolant thereto.

Preferably, the apparatus may further comprise a pump coupled to the first evaporative media and the heat exchanger via a first three way valve, and a second three way valve coupled to the first three way valve and the first and second evaporative media, wherein the first and second three way valves enable selective circulation of the coolant to at least one of the heat exchanger, and the first and second evaporative media.

Preferably, the apparatus may further be operable in a third mode, in which only the first and second evaporative media are activated to use the coolant to cool the air to the first temperature.

Preferably, the first evaporative media may include being arranged to be integrally formed with the second evaporative media to provide a single evaporative media.

According to a $2^{nd}$ aspect of the invention, there is provided a method of lowering temperature of air using an apparatus, which includes a fluid storage device for holding a volume of coolant, a cooling device having a heat exchanger and a first evaporative media arranged in fluid communication with the fluid storage device, and a heat rejection device having a second evaporative media arranged in fluid communication with the fluid storage device and the heat exchanger. The method comprises: passing air through the cooling device; and operating the apparatus between at least first and second modes to lower the temperature of the air. In the first mode, only the first evaporative media is operatively activated to use the coolant to cool the air to a first temperature, and in the second mode, the first and second evaporative media and the heat exchanger are collectively activated to use the coolant to cool the air to a second temperature being lower than the first temperature.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIGS. 1a to 1b are respective schematic diagrams of a first apparatus operating in different modes, according to a first embodiment, whereas

FIG. 2 is a flow diagram of a method of lowering temperature of air using the first apparatus of FIG. 1a;

FIGS. 3a to 3c are respective schematic diagrams of a second apparatus operating in different modes, according to a second embodiment, whereas

FIGS. 4a to 4b are respective schematic diagrams of a third apparatus operating in different modes, according to a third embodiment, whereas FIGS. 5a to 5c are respective schematic diagrams of a fourth apparatus operating in different modes, according to a fourth embodiment, whereas

DETAILED DESCRIPTION OF PREFERRED EMBODIMENTS

Figure 1A:
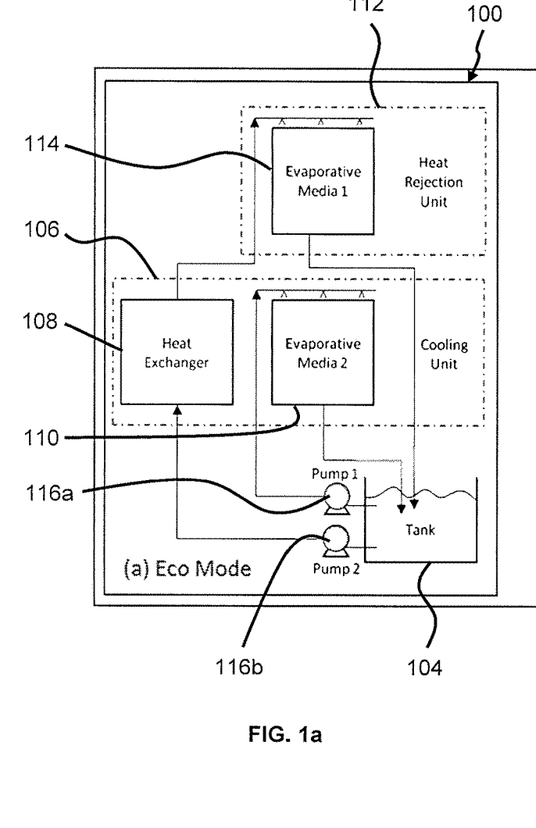
Figure 1B:
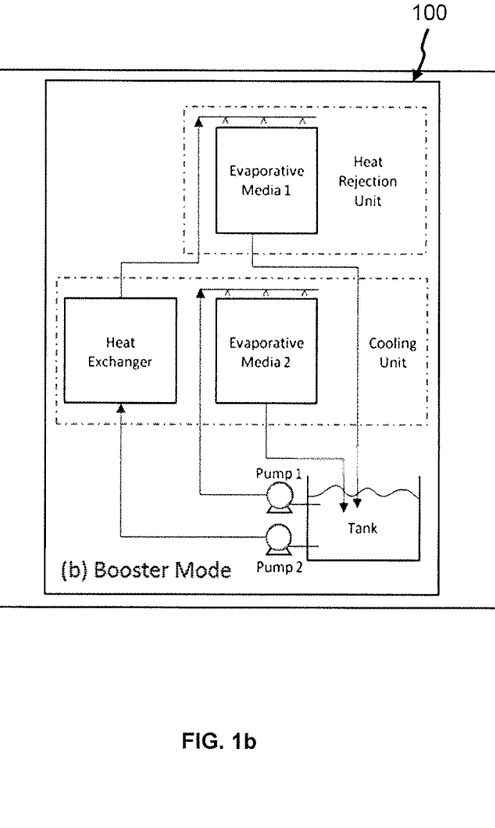
Figure 1C:
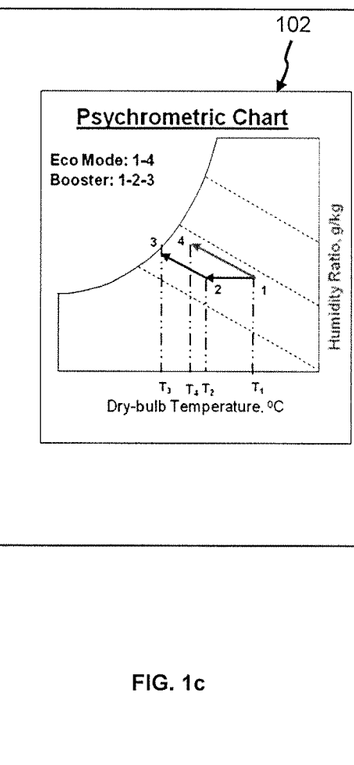
FIG. 1c depicts a psychrometric chart depicting respective processes of the different modes.

With reference to FIGS. 1a to 1b, respective schematic diagrams of a first apparatus 100 operating in different modes are depicted, according to a first embodiment. Then, FIG. 1c is a psychrometric chart 102 depicting respective processes of the different modes. Broadly, the first apparatus 100 comprises: a fluid storage device 104 (e.g. a tank) for holding a volume of coolant; a cooling device 106 having a heat exchanger 108 and a first evaporative media 110 arranged in fluid communication with the fluid storage device 104, the cooling device 106 configured to enable air to be passed therethrough; and a heat rejection device 112 having a second evaporative media 114 arranged in fluid communication with the fluid storage device 104 and the heat exchanger 108. The first and second evaporative media 110, 114 operate using the coolant which may be water, but is not to be construed as limiting. The first apparatus 100 is operable between at least first and second modes for lowering temperature of the air, in which in the first mode, only the first evaporative media 110 is operatively activated to use the coolant to cool the air to a first temperature, and in the second mode, the first and second evaporative media 110, 114 and the heat exchanger 108 are collectively activated to use the coolant to cool the air to a second temperature being lower than the first temperature. It is to be appreciated that the first and second evaporative media 110, 114 are operatively activated via wetting of the respective media 110, 114 using the coolant circulated thereto, which is accomplished using pumps (to be detailed below). Also, whether in the first or second mode, the coolant is arranged to be circulated through the apparatus 100 to the necessary components, when the apparatus 100 is in operation. The advantage of the apparatus 100 is that it enables optimisation of flow of the coolant in order to maximise first and second temperature outputs.

It is to be appreciated that the first mode may be termed as "Eco mode", which is shown in FIG. 1a, and the second mode may be termed as "Booster mode", which is shown in FIG. 1b. The devised purpose of first apparatus 100 operating between the first and second modes is to allow variation of effectiveness in using the coolant to cool the air being passed through the cooling device 106, and hence the first apparatus 100 may also be known as a varying water management system (in instances where the water is used as the coolant). The first apparatus 100 may also further comprises first and second pumps 116a, 116b respectively coupled to the first evaporative media 110 and the heat exchanger 108 to circulate the coolant thereto, and also to the second evaporative media 114.

In Eco mode (i.e. see FIG. 1a), the first pump 116a is in operation to provide the coolant to the first evaporative media 110 to cool the air via direct evaporative cooling within the cooling device 106, whilst the remaining components of the first apparatus 100 are configured to be inactive. In Booster mode (i.e. see FIG. 1b), both the first and second pumps 116a, 116b are configured to be active, in order to provide the coolant to the first and second evaporative media 110, 114, and the heat exchanger 108. It is to be appreciated that the heat exchanger 108 provides sensible cooling to the air, following which the coolant passing through the heat exchanger 108 is consequently warmed during the process. This warmed coolant is then circulated to the second evaporative media 114 for regeneration (i.e. to remove heat from the warmed coolant) and thereafter the regenerated coolant is returned to the fluid storage device 104. Similar to the Eco mode, the first pump 116a supplies the coolant (from the fluid storage device 104) to the first evaporative media 110, to thereby provide additional further cooling for the air, after being already cooled by the heat exchanger 108.

Respective processes corresponding to the Eco and Booster modes are illustrated in the psychrometric chart 102 of FIG. 1c. Specifically, process 1→4, indicated in FIG. 1c, represents the temperature change of the air (introduced into the cooling device 106) under the Eco mode, and is also applicable to operation of the heat rejection device 112 under the Booster mode. Referring to FIG. 1c, the initial temperature of the air is $T_1$, and after being cooled by the first evaporative media 110, the temperature drops to $T_4$ (i.e. the first temperature). On the other hand, the Booster mode is represented by a sensible cooling phase (indicated by process 1→2) followed by an adiabatic cooling phase (indicated by process 2→3) as shown in FIG. 1c. Again, referring to FIG. 1c, the initial temperature of the air is $T_1$, and after being cooled by the heat exchanger 108, the temperature drops to $T_2$. After being additionally cooled by the second evaporative media 114, the temperature of the air drops further from $T_2$ to $T_3$ (i.e. the second temperature). It will be appreciated that $T_3 < T_4$ from FIG. 1c. So, operation of the first apparatus 100 is fairly simple with the first and second pumps 116a, 116b driving two independent water circuits—the first water circuit is formed by the fluid storage device 104, the first pump 116a, and the first evaporative media 110, whereas the second water circuit is formed by the fluid storage device 104, the second pump 116b, the heat exchanger 108 and the second evaporative media 114.

Figure 2:
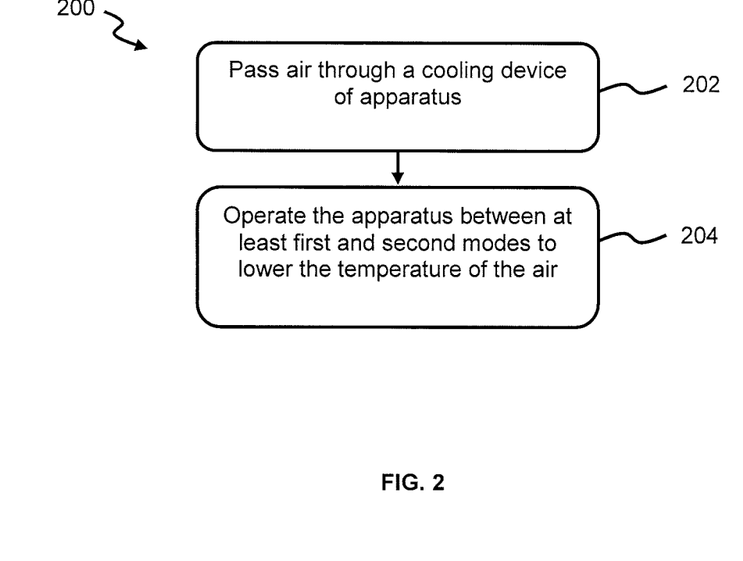

Now, with reference to FIG. 2, a method 200 of lowering temperature of air using the first apparatus 100 is described. Broadly, the method 200 comprises: at step 202, passing the air through the cooling device 106; and at step 204, operating the first apparatus 100 between at least first and second modes to lower the temperature of the air. As aforementioned, in the first mode, only the first evaporative media 110 is operatively activated to use the coolant to cool the air to a first temperature, and in the second mode, the first and second evaporative media 110, 114 and the heat exchanger 108 are collectively activated to use the coolant to cool the air to a second temperature being lower than the first temperature.

Further embodiments of the invention will be described hereinafter. For the sake of brevity, description of like elements, functionalities and operations that are common between the embodiments are not repeated; reference will instead be made to similar parts of the relevant embodiment(s).

Figure 3A:
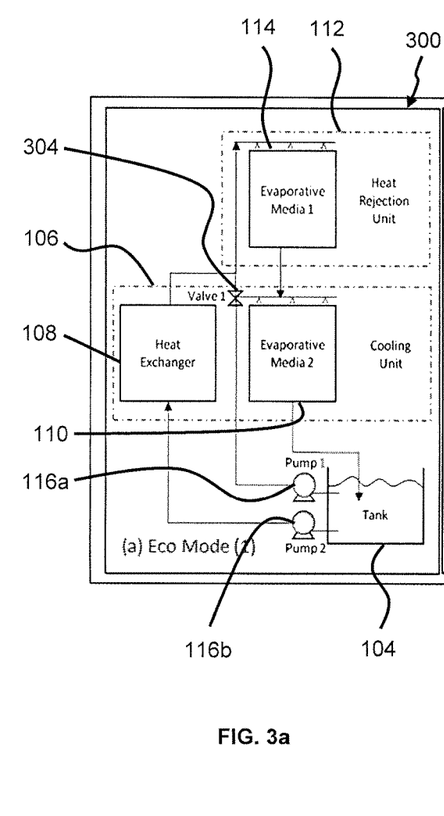
Figure 3B:
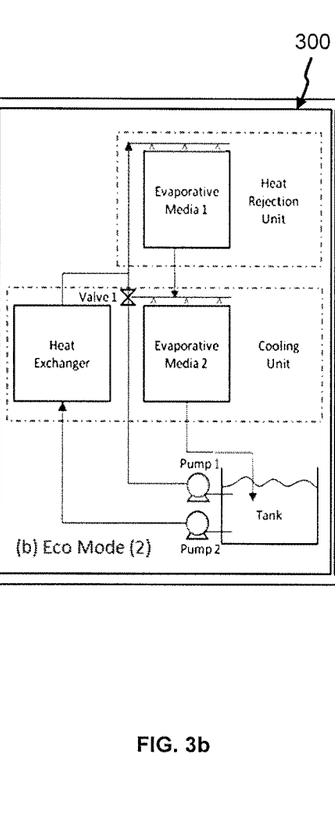
Figure 3C:
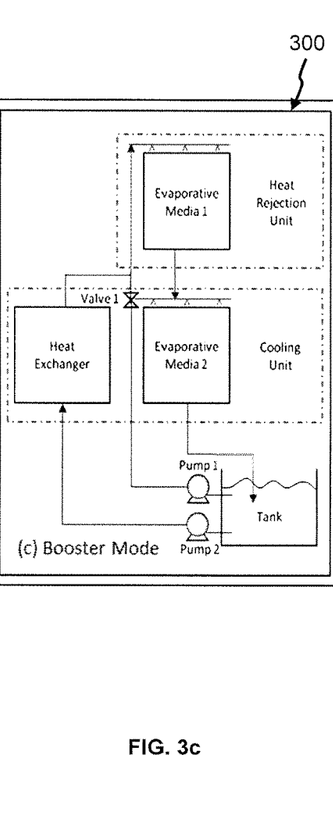
Figure 3D:
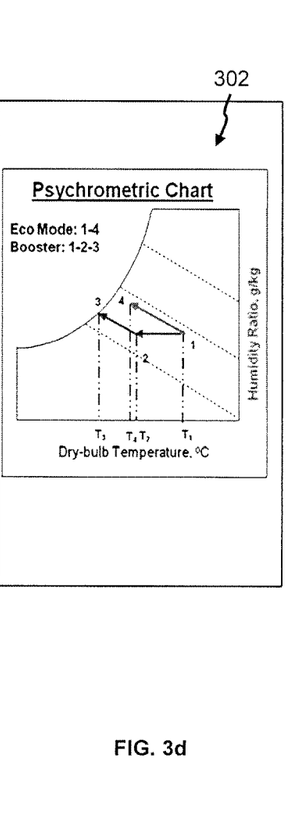
FIG. 3d depicts a psychrometric chart depicting respective processes of the different modes.

FIGS. 3a to 3c are respective schematic diagrams of a second apparatus 300 operating in different modes, according to a second embodiment, whereas FIG. 3d depicts a psychrometric chart 302 depicting respective processes of the different modes. The second apparatus 300 is largely similar to the first apparatus 100, except that the second evaporative media 114 is now configured to be in fluid communication with the fluid storage device 104 via the first evaporative media 110—that is, output of the second evaporative media 114 is now fed directly into the first evaporative media 110. Additionally, the second apparatus 300 further comprises a three way valve 304 coupled to the first and second evaporative media 110, 114, and the first pump 116a to enable selective circulation of the coolant to at least one of the first and second evaporative media 110, 114. The three way valve 304 is adapted to be controlled using a logic controller (not shown). With inclusion of the three way valve 304, the second apparatus 300 is also operable in a third mode (in addition to the first and second modes as per the first apparatus 100), in which only the first and second evaporative media 110, 114 are activated to use the coolant to cool the air to also the first temperature. In this embodiment, the first mode may be termed as "Eco mode #1" (i.e. FIG. 3a), while the second mode is still termed as the "Booster mode" (i.e. FIG. 3c), and the third mode may be termed as "Eco mode #2" (i.e. FIG. 3b).

In Eco mode #1, the first pump 116a is in operation to provide the coolant (via the three way valve 304) to the first evaporative media 110 to cool the air via direct evaporative cooling within the cooling device 106, whilst the remaining components of the first apparatus 100 are configured to be inactive. It is to be appreciated that the three way valve 304 is configured to be only partially opened in Eco mode #1, which is devised to deliver similar cooling capacity and energy consumption as the Eco mode of the first apparatus 100.

In Eco mode #2, the three way valve 304 is now arranged to be fully opened, so that the coolant can be circulated to both the first and second evaporative media 110, 114, whilst the heat exchanger 108 remains inactive. It is to be appreciated that the total air flow introduced into the cooling device 106 is increased in Eco mode #2 compared to Eco mode #1, which therefore increases the total cooling capacity of the second apparatus 300.

In Booster mode, the first pump 116a is configured to be inactive, whereas the second pump 116b is configured to be active. The three way valve 304 is partially opened. Hence, the coolant is circulated within components of the second apparatus 300 in the following order: the heat exchanger 108, the second evaporative media 114 and the first evaporative media 110. Particularly, the coolant is arranged to loop through both the first and second evaporative media 110, 114 to ensure the coldest possible coolant temperature in the fluid storage device 104. Overall, the second apparatus 300 is able to achieve a larger cooling capacity (comparative to the first apparatus 100), through using the Eco mode #2 and the Booster mode, and yet advantageously have a lower energy consumption compared to the first apparatus 100.

Figure 4A:
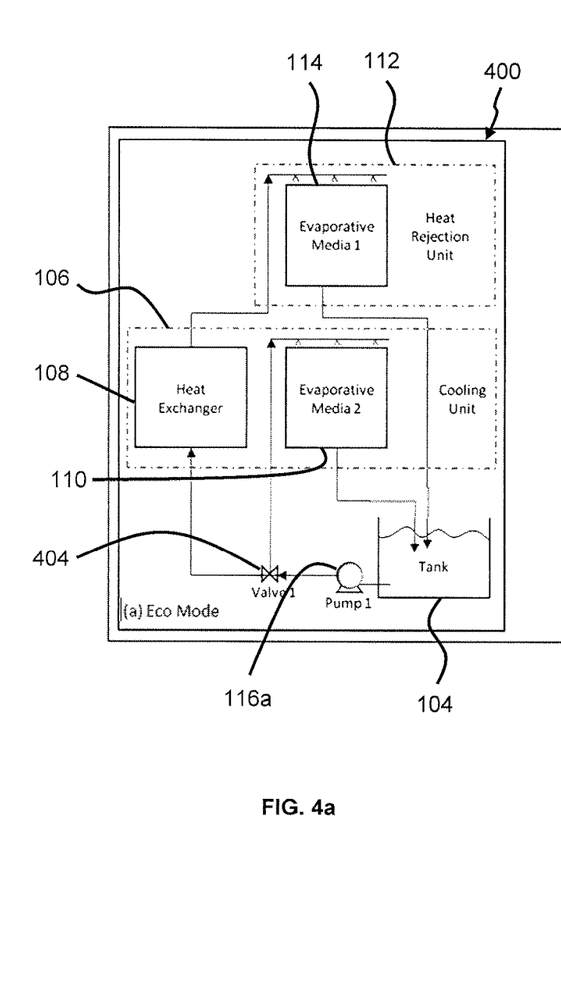
Figure 4B:
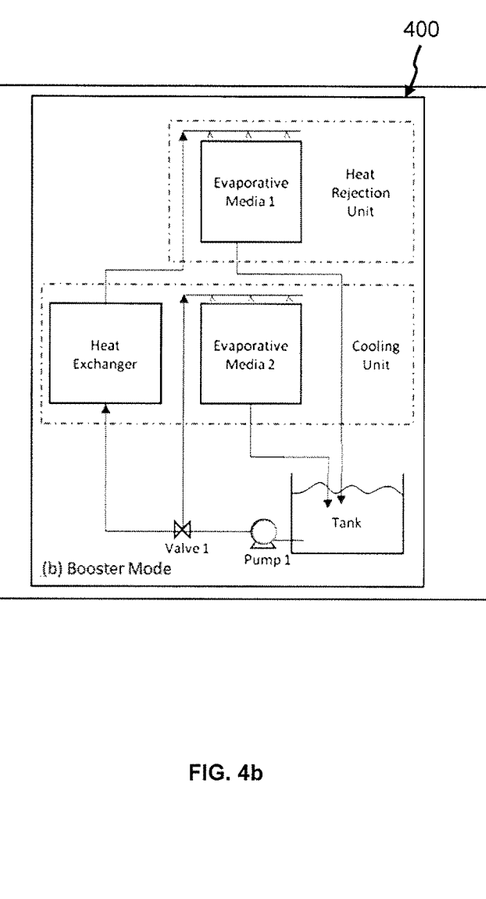
Figure 4C:
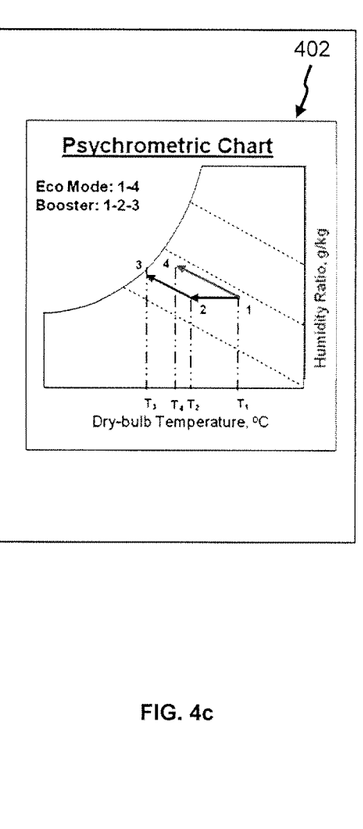
FIG. 4c depicts a psychrometric chart depicting respective processes of the different modes.

Next, FIGS. 4a to 4b are respective schematic diagrams of a third apparatus 400 operating in different modes, according to a third embodiment, whereas FIG. 4c depicts a psychrometric chart 402 depicting respective processes of the different modes. The third apparatus 400 is largely similar to the first apparatus 100, except that the second pump 116b is now omitted, and that the first pump 116a is arranged to be coupled to the first evaporative media 110 and the heat exchanger 108 via a three way valve 404 to enable selective circulation of the coolant thereto.

For this embodiment, there are just two modes: the Eco mode (i.e. FIG. 4a) and the Booster mode (i.e. FIG. 4b), which operate largely identical to the respective corresponding modes of the first apparatus 100. In the Eco mode, the three way valve 404 is partially opened in order to enable the first pump 116a to provide the coolant to the first evaporative media 110 to cool the air via direct evaporative cooling within the cooling device 106, whilst the remaining components of the third apparatus 400 are configured to be inactive. In the Booster mode, the three way valve 404 is fully opened, so that the coolant is circulated to the first and second evaporative media 110, 114, and the heat exchanger 108. Hence, the third apparatus 400 is also configured to deliver cooling capacities similar to the first apparatus 100. Beneficially, relative to the first apparatus 100, the third apparatus 400 minimises the following criteria: total component numbers, water system complexity and energy consumption.

Figure 5A:
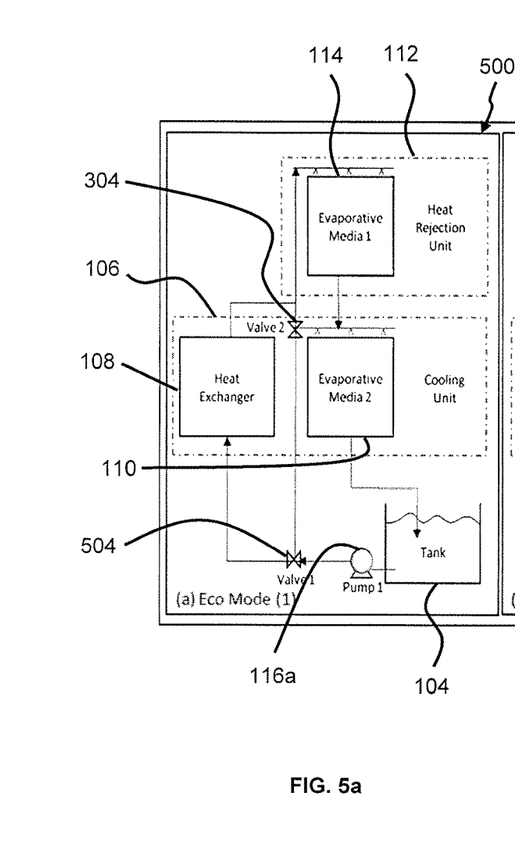
Figure 5B:
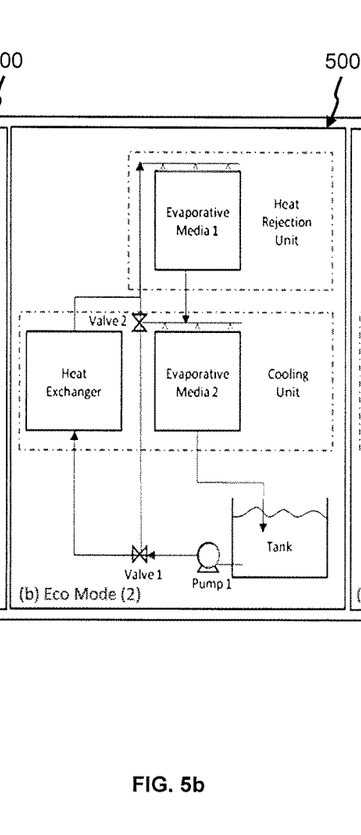
Figure 5C:
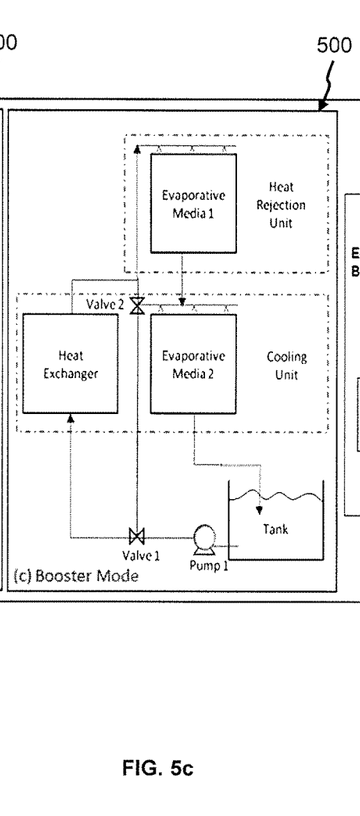
Figure 5D:
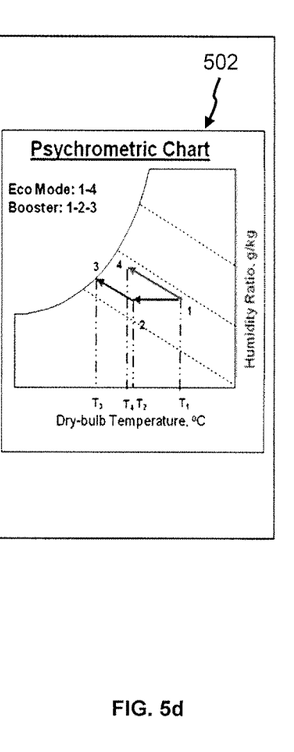
FIG. 5d depicts a psychrometric chart depicting respective processes of the different modes.

FIGS. 5a to 5c are respective schematic diagrams of a fourth apparatus 500 operating in different modes, according to a fourth embodiment, whereas FIG. 5d depicts a psychrometric chart 502 depicting respective processes of the different modes. The fourth apparatus 500 is largely identical to the second apparatus 300, except that the second pump 116b is now omitted, and that the first pump 116a is arranged to be coupled to the first evaporative media 110 and the heat exchanger 108 via an additional three way valve 504 to enable selective circulation of the coolant thereto. It is to be appreciated that the additional three way valve 504 is coupled to the three way valve 304 (disclosed in the second apparatus 300). For ease of description herein, the three way valve 304 (disclosed in the second apparatus 300) is referred to as the first valve 304, while the additional three way valve 504 is referred to as the second valve 504 (which is also controllable using a logic controller). Similar to the second apparatus 300, the fourth apparatus 500 is also operable in three modes: "Eco mode #1" (i.e. FIG. 5a), "Eco mode #2" (i.e. FIG. 5b), and "Booster mode" (i.e. FIG. 5c).

In Eco mode #1, the first and second valves 304, 504 are both partially opened, so that the first pump 116a is able to circulate the coolant to the first evaporative media 110 to cool the air via direct evaporative cooling within the cooling device 106, whilst the remaining components of the fourth apparatus 500 are configured to be inactive. The cooling performance achieved by Eco mode #1 of the fourth apparatus 500 is same as Eco mode #1 of the second apparatus 300.

In Eco mode #2, the second valve 504 is partially opened, while the first valve 304 is now fully opened, so that the coolant can be circulated to both the first and second evaporative media 110, 114, whilst the heat exchanger 108 remains inactive. It is to be appreciated that the total air flow introduced into the cooling device 106 is increased in Eco mode #2 compared to Eco mode #1, which therefore increases the total cooling capacity of the fourth apparatus 500.

In Booster mode, both the first and second valves 304, 504 are fully opened. Hence, the coolant is circulated within components of the fourth apparatus 500 in the following order: the heat exchanger 108, the second evaporative media 114 and the first evaporative media 110. In particular, the coolant is arranged to loop through both the first and second evaporative media 110, 114 to ensure the coldest possible coolant temperature in the fluid storage device 104. Needless to say, the fourth apparatus 500 also delivers similar cooling capacities as the second apparatus 300. However, the fourth apparatus 500 is slightly more complex in terms of circuitry arrangement, although the fourth apparatus 500 also has the lowest equipment numbers and energy consumption (among all the different disclosed embodiments).

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

For example, in the second apparatus 300 and the fourth apparatus 500, the first evaporative media 110 is now integrally formed with the second evaporative media 114 as one single evaporative media (not shown). The single evaporative media is configured to be in fluid communication with the fluid storage device 104 and the heat exchanger 108. It is to be appreciated that one part of the single evaporative media is arranged in the heat rejection device 112, and the other part of the single evaporative media is then arranged in the cooling device 106. In such an instance, any fluid connections between the first evaporative media 110 and the second evaporative media 114, previously described in the second and fourth embodiments, are therefore no longer necessary. In this variation, the heat rejection device 112 is adapted to also enable a stream of air to pass through the heat rejection device 112 to be cooled by the one part of the single evaporative media arranged in the heat rejection device 112.

The invention claimed is:

1. An apparatus comprising:
   a fluid storage device for holding a volume of coolant;
   a cooling device having a heat exchanger and a first evaporative media arranged in fluid communication with the fluid storage device, the cooling device configured to enable air to be passed through the heat exchanger first and then subsequently the first evaporative media;
   a heat rejection device having a second evaporative media arranged in fluid communication with the fluid storage device and the heat exchanger; and
   a pump,
   a first three-way valve,
   a first water circuit formed by the fluid storage device, the pump, the first three-way valve and the first evaporative media, wherein the first water circuit is configured to circulate the coolant from the fluid storage device to the first evaporative media before being circulated back to the fluid storage device,
   a second water circuit formed by the fluid storage device, the pump, the first three-way valve, the heat exchanger and the second evaporative media, wherein the second water circuit is configured to circulate the coolant from the fluid storage device to the heat exchanger and then subsequently to the second evaporative media before being circulated back to the fluid storage device,
   wherein the pump is coupled to the first evaporative media and the heat exchanger via the first three-way valve to enable circulation of the coolant from the fluid storage device to the first evaporative media and the heat exchanger,
   wherein the first three-way valve is configured to operate the apparatus between at least first and second modes for lowering temperature of the air, in which in the first mode, only the first evaporative media is operatively activated to use the coolant to cool the air to a first temperature, and in the second mode, the first and second evaporative media and the heat exchanger are collectively activated to use the coolant to cool the air to a second temperature being lower than the first temperature.

2. The apparatus of claim 1, wherein the coolant includes water.

3. The apparatus of claim 1, wherein the second evaporative media is in fluid communication with the fluid storage device via the first evaporative media.

4. The apparatus of claim 3, further comprising a second three way valve coupled to the first and second evaporative media, and the pump to enable selective circulation of the coolant to at least one of the first and second evaporative media.

5. The apparatus of claim 4, wherein the second three way valve is adapted to be controlled using a logic controller.

6. The apparatus of claim 3, wherein the apparatus is further operable in a third mode, in which only the first and second evaporative media are activated to use the coolant to cool the air to the first temperature.

7. The apparatus of claim 3, further comprising a second three way valve coupled to the first three way valve and the first and second evaporative media, wherein the first and second three way valves enable selective circulation of the coolant to at least one of the heat exchanger, and the first and second evaporative media.

8. The apparatus of claim 7, wherein the apparatus is further operable in a third mode, in which only the first and second evaporative media are activated to use the coolant to cool the air to the first temperature.

9. The apparatus of claim 1, wherein the first evaporative media includes being arranged to be integrally formed with the second evaporative media to provide a single evaporative media.

10. A method of lowering temperature of air using an apparatus of claim 1, the method comprises:
    passing air through the cooling device; and
    operating the apparatus between at least first and second modes to lower the temperature of the air,
    wherein in the first mode, only the first evaporative media is operatively activated to use the coolant to cool the air to a first temperature, and in the second mode, the first and second evaporative media and the heat exchanger are collectively activated to use the coolant to cool the air to a second temperature being lower than the first temperature.

* * * * *